US008106926B2

United States Patent
Zipnick

(10) Patent No.: US 8,106,926 B2
(45) Date of Patent: Jan. 31, 2012

(54) CONTROLLING A DISPLAY DEVICE TO DISPLAY PORTIONS OF AN ENTIRE IMAGE IN A DISPLAY AREA

(75) Inventor: Jay David Zipnick, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/104,894

(22) Filed: May 10, 2011

(65) Prior Publication Data

US 2011/0210985 A1    Sep. 1, 2011

Related U.S. Application Data

(63) Continuation of application No. 11/176,797, filed on Jul. 6, 2005, now Pat. No. 7,944,455.

(51) Int. Cl.
*G09G 5/373* (2006.01)
*G09G 5/34* (2006.01)

(52) U.S. Cl. ......................... 345/660; 345/672

(58) Field of Classification Search .................. 345/660, 345/667, 672, 682
See application file for complete search history.

(56) References Cited

U.S. PATENT DOCUMENTS

| | | | |
|---|---|---|---|
| 5,313,567 A | 5/1994 | Civanlar et al. |
| 6,028,645 A | 2/2000 | Reid et al. |
| 6,069,606 A | 5/2000 | Sciammarella et al. |
| 6,384,869 B1 | 5/2002 | Sciammarella et al. |
| 6,570,582 B1 | 5/2003 | Sciammarella et al. |
| 6,850,689 B1 | 2/2005 | Ozawa et al. |
| 6,956,589 B2 | 10/2005 | Lipsky et al. |
| 6,987,522 B2 | 1/2006 | Lipsky et al. |
| 6,989,848 B2 | 1/2006 | Lipsky et al. |
| 7,050,072 B2 | 5/2006 | Lipsky et al. |
| 7,248,294 B2 | 7/2007 | Slatter |
| 2002/0158887 A1 | 10/2002 | Samra et al. |
| 2004/0257340 A1 | 12/2004 | Jawerth |
| 2006/0132507 A1 | 6/2006 | Wang |
| 2006/0232611 A1 | 10/2006 | Brooke |
| 2007/0120856 A1 | 5/2007 | De Ruyter et al. |

OTHER PUBLICATIONS

Using Doc View chapter 6, http://web.archive.org/web20011123204053/http://docmorph.nlm.nih.gov/docview/distrib/6.htm, internet archive date of Nov. 23, 2001, pp. 1-9.
Lance Good and Benjamin B. Bederson; Zoomable user interfaces as a medium for slide show presentations; Mar. 2002; Information Visualization (2002), vol. 1, Issue 1 (Mar. 2002), pp. 35-49.
Tomer Moscovich, Karin Scholz, John F. Hughes, and David H. Salesin; Customizable Presentations; Oct. 2004; Department of Computer Science, Brown University, CS-04-16, pp. 1-7.
Antony Bolante; Moving Images: Premiere's Image Pan Effect; May, 2001; Adobe Press; 10 pages.
Julia Layton; How iPods Work; iPod Click Wheel; 2006; HowStuffWorks; 4 pages.

*Primary Examiner* — Jeffery A Brier
(74) *Attorney, Agent, or Firm* — Beyer Law Group LLP

(57) ABSTRACT

A computer-implemented method is for controlling display of an image, in a display area, by a display device. A plurality of elements of a sequence is determined based on operation of an input device. A position in the entire image is determined, associated with the determined one of the plurality of elements in the sequence. Based on the determined position in the entire image, a corresponding portion of the entire image is caused to be displayed in the display area.

16 Claims, 5 Drawing Sheets

CONTROLLING A DISPLAY DEVICE TO DISPLAY PORTIONS OF AN ENTIRE IMAGE IN A DISPLAY AREA

CROSS REFERENCE TO RELATED APPLICATION

This application is a continuation of U.S. patent application Ser. No. 11/176,797, filed Jul. 6, 2005, and entitled "CONTROLLING A DISPLAY DEVICE TO DISPLAY PORTIONS OF AN ENTIRE IMAGE IN A DISPLAY AREA," which is hereby incorporated herein by reference and from which priority under 35 U.S.C. §120 is claimed.

TECHNICAL FIELD

The present invention is in the field of controlling a display device and, more particularly, relates to controlling a display device to display portions of an entire image.

BACKGROUND

Conventionally, a digital camera user may, while viewing a display of the digital camera, zoom in from viewing an entire image to cause a smaller portion of the entire image to be displayed. FIG. 1 illustrates a digital camera 100 having a display screen 102 and navigational controls 104. With a smaller portion of the entire image displayed on the display screen 102, the user can "navigate" the entire image in two dimensions. That is, the user can cause different smaller portions of the entire image to be displayed on the display screen.

The navigational controls 104 may be, for example, four different directional controls of the camera to navigate right 106, left 108, up 110 and down 112 in the entire image. To navigate to a desired smaller portion of the entire image, the user typically operates the directional controls multiple times, alternating between operating different directional controls.

Furthermore, if the currently-displayed smaller portion has little context with respect to the entire image, it may be difficult for the user to navigate to a desired smaller portion of the entire image. An example of this is illustrated in FIGS. 2A, 2B and 2C. FIG. 2A illustrates an entire image. FIG. 2B illustrates a smaller portion of the FIG. 2A image, including an airplane. The airplane may provide enough context with respect to the entire image such that a user can relatively easily navigate with respect to the smaller portion illustrated in FIG. 2B.

FIG. 2C, however, illustrates a smaller portion of the FIG. 2A image that is dominated by sky. Given the uniformity of the sky portion of the image, there may not be enough context with respect to the entire image such that a user can confidently navigate with respect to the smaller portion illustrated in FIG. 2C.

SUMMARY

A computer-implemented method is for controlling display of an image, in a display area, by a display device. A plurality of elements of a sequence is determined based on operation of an input device. A position in the entire image is determined, associated with the determined one of the plurality of elements in the sequence. Based on the determined position in the entire image, a corresponding portion of the entire image is caused to be displayed in the display area. Thus, for example, as display of the image is controlled to different zoom levels, a user can efficiently navigate around the entire image even though only a portion of the entire image is viewable at a time.

DETAILED DESCRIPTION

In accordance with a broad aspect of the invention in a media player (including, for example, a digital camera having a display), positions in an entire image are associated with elements of a sequence. A particular element of the sequence is determined based on operation of an input device of the media player. Based on the determined particular element of the sequence, a portion of the entire image is displayed.

Figure 1:
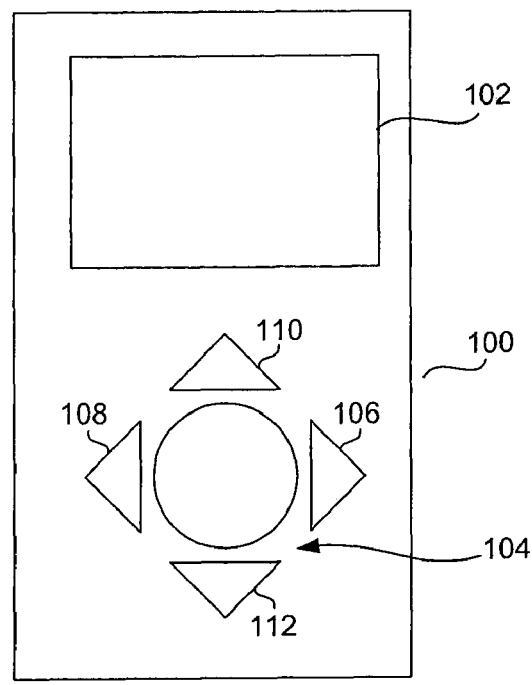
FIG. 1 illustrates a digital camera having a display screen and navigational controls.
Figure 2A:
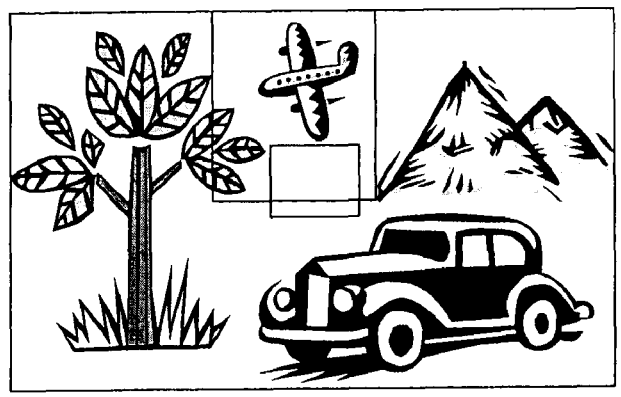
FIGS. 2A, 2B and 2C illustrate how the amount of context affects the user's ability to navigate an entire image using a small portion of the entire image that does not provide sufficient context for navigation.
Figure 2B:
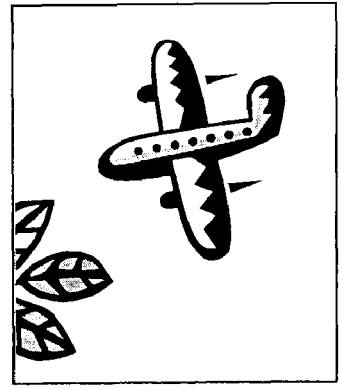
Figure 2C:
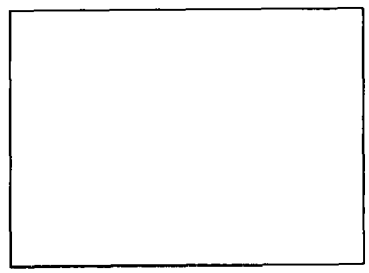
Figure 3:
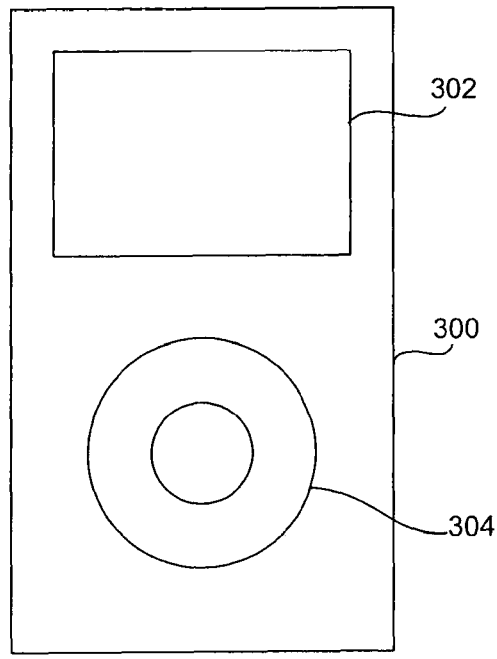
FIG. 3 illustrates a media player having an input device that may be particularly well suited for use to determine particular elements of a sequence.

FIG. 3 illustrates a media player having an input device that may be particularly well-suited for use to determine particular elements of the sequence, although other types of input devices (including, for example, the input device of the FIG. 1 digital camera) may be used. In particular, FIG. 3 illustrates a well-known media player 300 known as an iPod™ media player, from Apple Computer, Inc. of Cupertino, Calif. The media player 300 includes a display device 302 and a click wheel input device 304. In one example, in response to an amount of rotational movement a user has invoked with respect to the click wheel 304, a number of units value is generated by the click wheel 304. The number of units value is provided to scroll processing within the media player 300. An output of the scroll processing is provided to other processing within the media player such as, for example, display processing. In accordance with other examples of input devices, an output of the input device, when activated, is a value representing an absolute position, rather than a relative position such as the number of units value.

Figure 4:
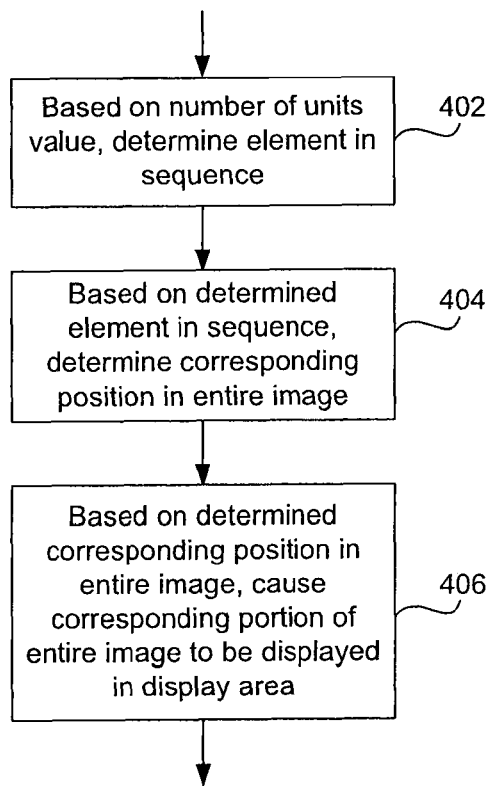
FIG. 4 is a flowchart illustrating a method to control which portion of an entire image is to be displayed.

One type of display processing is display processing to control display of a portion of an entire image—more precisely, controlling which such portion is to be displayed. One such example is broadly described with reference to FIGS. 4 and 5. Referring first to FIG. 4, a flowchart illustrating steps of the example is shown.

Before describing FIG. 4, it is noted that, typically, before the steps of the FIG. 4 flowchart are executed, display of the image is controlled to be at a particular zoom level. In such a situation, typically, the steps of the FIG. 4 flowchart would be executed for display at the zoom level.

Figure 5:
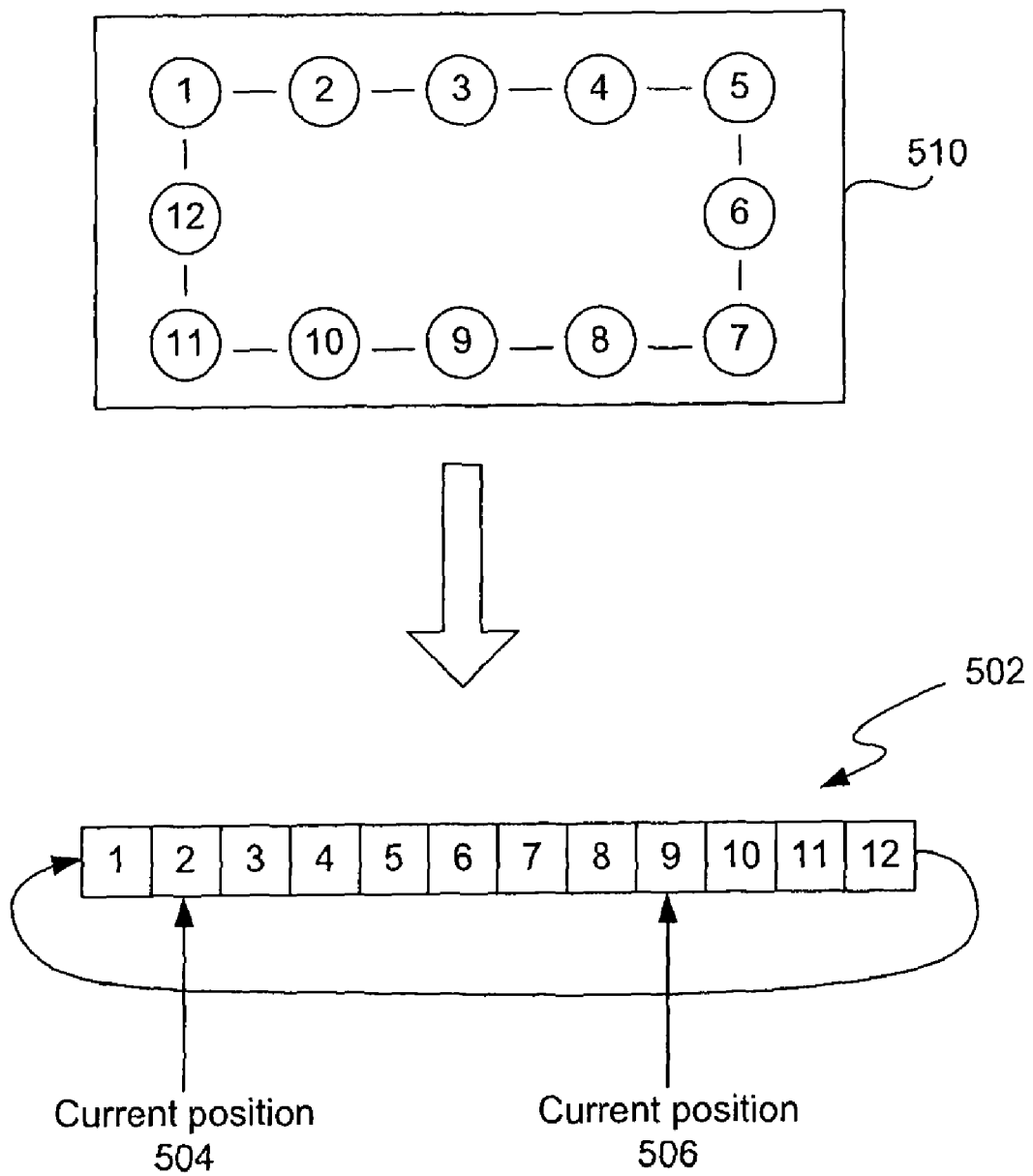
FIG. 5 illustrates a sequence useable by the FIG. 4 method.

At step 402, an element of a sequence is determined based on the number of units value from the click wheel 304. The sequence may be, for example, like the sequence 502 illustrated in FIG. 5. Referring to FIG. 5, the element of the sequence 502 as determined at step 402 of the FIG. 4 flowchart is, in one simple example, determined simply by adding the number of units value to a current position value. The number of units value may be weighted by a weighting factor.

For example, if the current position value is the current position value 504 (equal to two), then the element of the sequence is determined by adding the number of units value to two. Thus, if the number of units value is three, then the determined element of the sequence is five (two plus three). In accordance with another example, adding the number of units value to the current position value would extend beyond the end of the sequence. In such cases, a modulo function is employed, and the sequence "wraps around" due to the use of the modulo function.

In another example, the determined element in the sequence is a function of the absolute position associated with the input device, and does not depend on the relative movement of the input device, and a sequence of determined elements may be computed "on the fly" as the position associated with the input device is changed.

At step 404, based on the determined element in the sequence, the corresponding position in the entire image is determined. For example, referring to the example entire image 510 in FIG. 5, each element of the sequence 502 corresponds to a separate one of a sequence of positions in the entire image. The positions may be predetermined positions or, for example, the positions may be determined on the fly or otherwise determined. In addition, consecutive elements in the sequence generally, but need not, correspond to spatially adjacent positions in the entire image.

In the final step of the FIG. 4 flowchart, at step 406, based on the determined position in the entire image, a corresponding portion of the entire image is caused to be displayed. For example, the corresponding portion may be a portion of the entire image for which the determined position is in the center of that portion. As another example, the portions may be "pinned" such that no part of the portion falls outside the bounds of the entire image. Steps 404 and 406 are discussed in greater detail below. If the portions are not "pinned," and a part of what would nominally be a portion would fall outside the bounds of the entire image, the part of the portion outside the bounds of the entire image may be displayed with a pattern such as, for example, hatch or solid black.

Figure 6:
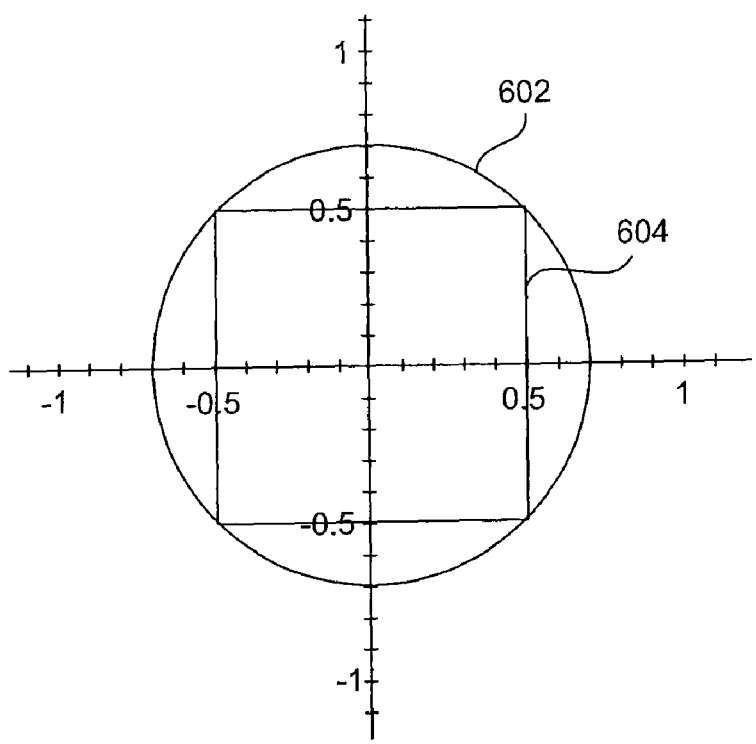
FIG. 6 illustrates two examples of closed-loop paths of possible determined positions in an entire image.

FIG. 6 illustrates two examples of closed-loop paths of possible determined positions. The two examples are an oval-shaped path 602 and a rectangle-shaped path 604. In general, the density of the possible predetermined positions along the path depends on the number of elements in the sequence (which, in turn, may be a function of the resolution of the input device), although the possible predetermined positions need not be of uniform density along the path. For the example paths 602 and 604 in FIG. 6, using the circular path may yield identical views (where a "view" is the displayed portion) if the view for the circular path is pinned to stay within the bounds of the entire image (depending on the size of the views and the closeness of the path to the boundary of the entire image).

Figure 7:
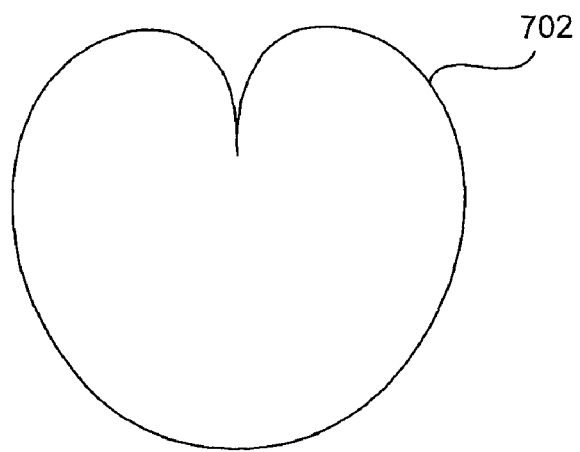
FIG. 7 shows a path that includes the center of the entire image.

It is noted that, taking the FIG. 6 paths 602 and 604 as examples, these paths do not pass through the center 801 of the entire image. It is desirable, in some examples, to display the view in the center of the entire image, with the center of the view coinciding with the center of the entire image. FIG. 7 shows a path 702 that includes the center of the entire image. The path 702 can be thought of as a cardioid-like path. (A true cardioid, defined about the center of the entire image, would not actually pass through the center of the entire image.) In one example, the view would initially be in the center 801 of the entire image and would thereafter follow the cardioid-like path. After one pass through the sequence, the view would again be back in the center of the entire image.

In the FIG. 6 and FIG. 7 examples, the closed-loop paths are such that, for substantially all radii emanating from a center of the entire image, that radius crosses the closed-loop path one time, and no more than one time. Put another way, which view is displayed can be thought of as a function of an angle (0 to $2\pi$) to which the user movement of the input device maps. For simplicity of explanation, we call such a closed-loop path a "simple" closed-loop path. In some examples, particularly where the entire image is much larger than a view, a simple closed-loop path generally would not be sufficient for all of the possible views along the path to collectively completely cover the area of the entire image. Thus, in other examples, non-simple ("complex") closed-loop paths are employed.

Figure 8:
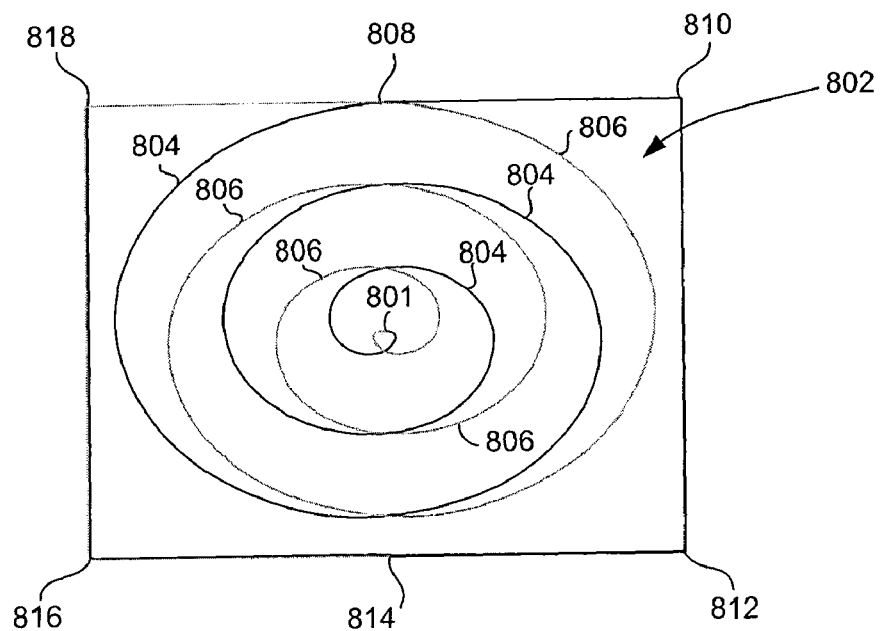
FIG. 8 illustrates a complex closed-loop path.
Figure 9:
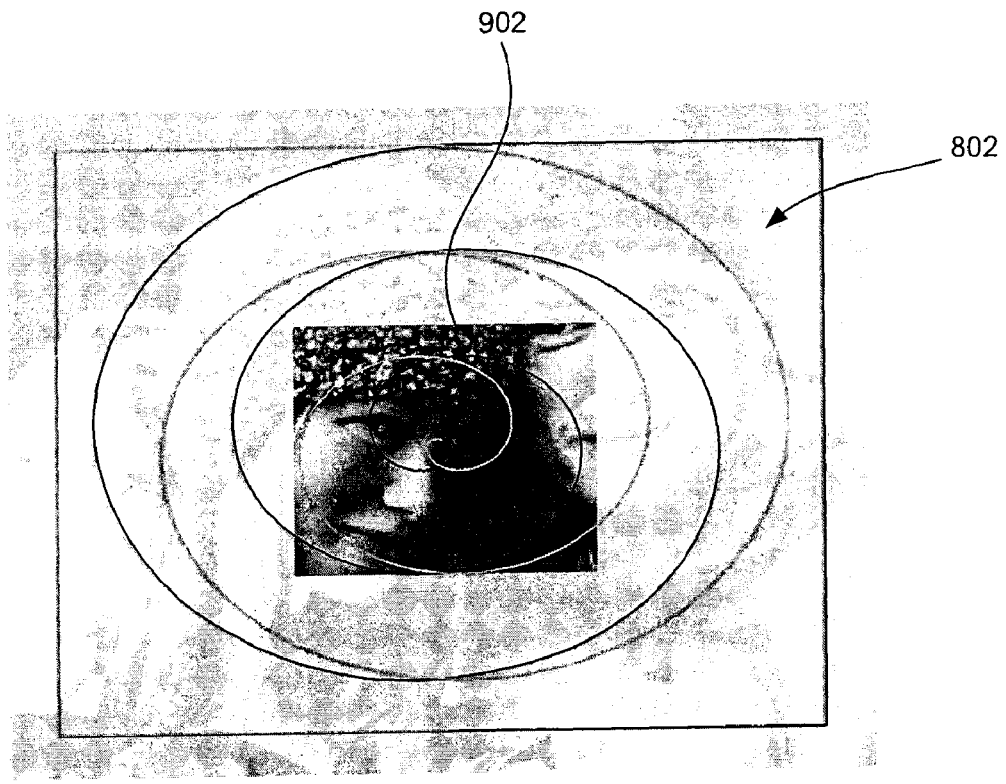
FIG. 9 illustrates the FIG. 8 path, with one view superimposed on the path, centered on the entire image.

With such complex functions, a particular angle to which the user movement of the input device maps may correspond to more than one view. FIG. 8 illustrates one example of a complex closed-loop path 802. FIG. 9 illustrates the FIG. 8 path, with one view superimposed on the path, centered on the entire image 902. Referring to FIG. 8, starting at the center and proceeding clockwise, for example, one portion 804 of the path spirals outward three times until reaching the top 808 of the entire image. The path then proceeds clockwise through points 810 and 812, to point 814. Still proceeding clockwise, the second part of the path proceeds through points 816 and 818, to point 808. Then the portion 806 of the path spirals three times, this time inward, and crossing the first part 804 of the path several times. Finally, the portion 806 of the path meets the portion 804 of the path at the center. Since the end of the path meets the beginning of the path, the path is a continuous path.

Thus, for example, movement of the user input device in a single direction (i.e., in a manner that causes the sequence to progress or regress in a single direction) will result in a navigation of views through the entire image (clockwise or counter-clockwise, as the case may be). Using the described method, a user can easily traverse a predetermined path through the entire image in view-sized pieces. In some examples, the path depends on the zoom level (i.e., the size of the view portions). For example, generally, the smaller the viewed image portions, the closer together are the parts of the path such that, for an entire traversal of the path, the parts of the entire image collectively viewed are maximized.

While this invention has been described in terms of several embodiments, there are alterations, permutations, and equivalents, which fall within the scope of this invention. It should also be noted that there are many alternative ways of implementing the methods and apparatuses of the present invention. For example, while particular shaped paths have been described, it should be noted that many other shape paths may be employed. For example, other spiral-shaped paths (such as, for example, logarithmic spirals and Archimedes spirals) may be employed. Furthermore, the positions need not even fall onto a path per se, although this is seen as a user-friendly approach. As another example, the method may involve displaying images on a display screen associated with, for example, a digital camera or media player. In other examples, however, the image is projected or otherwise caused to be displayed. It is therefore intended that the following appended claims be interpreted as including all such alterations, permutations, and equivalents as fall within the true spirit and scope of the present invention.

What is claimed is:

1. In a portable media player having a user input and a fixed size display device, a method of navigating an enlarged image presented by the fixed size display device, the enlarged image having an total image size greater than the fixed size of the display device, comprising;
   overlaying a movable window on a portion of the image;
   presenting the overlaid portion of the image at a first zoom level by the fixed size display device;
   receiving a user supplied navigation input at a user input device;
   causing the movable window to move in a direction along a first closed path corresponding to the first zoom level and in response to the user supplied navigation input wherein the direction of movement along the first closed path corresponds to a direction associated with the user supplied navigation input; and
   successively presenting a first pre-determined number of overlaid portions of the image at specific positions on the first closed path that cumulatively present substantially the entire image, wherein the first pre-determined number of successive overlaid portions is related to the first zoom level and the specific locations on the first closed path are based upon the first zoom level, wherein when the user supplied navigation input is circular in nature, then a first direction corresponds to a counterclockwise type user supplied navigation input and a second direction corresponds to a clockwise type user supplied navigation input.

2. The method as recited in claim 1, further comprising:
   changing the first zoom level to a second zoom level different from the first zoom level;
   changing the first closed path to a second closed path different from the first closed path in accordance with the second zoom level;
   receiving the user supplied navigation input;
   causing the movable window to move in the direction along the second closed path corresponding to the second zoom level and in accordance with the user supplied navigation input; and
   successively presenting a second pre-determined number of overlaid portions of the image at specific positions on the second closed path that cumulatively present substantially the entire image, the specific locations on the second closed path based upon the second zoom level, wherein the second pre-determined number of successive overlaid portions is related to the second zoom level.

3. The method of claim 2, wherein when the user supplied navigational input is a counter-clockwise motion by a user's finger in contact with a rotational input device, the movable window moves in a counter-clockwise manner along the first or second closed paths; and wherein clockwise motions by the user's finger on the rotational input device correspond to clockwise movement of the movable window along the first or second closed paths.

4. The method of claim 3, wherein the first closed path follows a perimeter of the entire image such that any portion of the image that is displayed based on a position in the first closed path contains a portion that is on the perimeter of the image.

5. The method of claim 4, wherein the second closed path follows a path that covers the center of the entire image such that at least one portion of the entire image that is displayed based on a position in the second closed path does not contain a portion that is on the perimeter of the entire image.

6. A system including:
   a user device comprising:
   a user input device designed to detect movement only in a clockwise or a counter-clockwise direction;
   a display, wherein the display that is not large enough to display the entirety of an image; and
   a processor configured to:
      overlay a movable window on a portion of the image,
      present the overlaid portion of the image at a first zoom level by the fixed size display device,
      receive a user supplied navigation input at a user input device,
      cause the movable window to move in a direction along a first closed path corresponding to the first zoom level and in response to the user supplied navigation input, wherein the direction of movement along the first closed path corresponds to a direction associated with the user supplied navigation input, and
      successively present a first pre-determined number of overlaid portions of the image at specific positions on the first closed path that cumulatively present substantially the entire image, wherein the first pre-determined number successive overlaid portions are related to the first zoom level and the specific locations on the first closed path are based upon the first zoom level, wherein when the user supplied navigation input is circular in nature, then a first direction corresponds to a counterclockwise type user supplied navigation input and a second direction corresponds to a clockwise type user supplied navigation input.

7. The system as recited in claim 6, further comprising:
   changing the first zoom level to a second zoom level different from the first zoom level;
   receiving the user supplied navigation input;
   causing the movable window to move in the direction along a second closed path corresponding to the second zoom level and in accordance with the user supplied navigation input; and
   successively presenting a second pre-determined number of overlaid portions of the image at specific positions on the second closed path that cumulatively present substantially the entire image, the specific locations on the second closed path based upon the second zoom level.

8. The system of claim 7, wherein when the user supplied navigational input is a counter-clockwise motion by a user's finger in contact with a rotational input device, the movable window moves in a counter-clockwise manner along the first or second closed paths; and wherein clockwise motions by the user's finger on the rotational input device correspond to clockwise movement of the movable window along the first or second closed paths.

9. The system of claim 8, wherein the first closed path follows a perimeter of the entire image such that any portion of the image that is displayed based on a position in the first closed path contains a portion that is on the perimeter of the image.

10. The system of claim 9, wherein the second closed path follows a path that covers the center of the entire image such that at least one portion of the entire image that is displayed based on a position in the second closed path does not contain a portion that is on the perimeter of the entire image.

11. The system as recited in claim 6, wherein the system is a portable media player.

12. Non-transitory computer readable medium for storing computer code executed by a processor in a portable media player having a user input and a fixed size display device for navigating an enlarged image presented by the fixed size display device, the enlarged image having an total image size greater than the fixed size of the display device, comprising;

computer code for overlaying a movable window on a portion of the image;

computer code for presenting the overlaid portion of the image at a first zoom level by the fixed size display device;

computer code for receiving a user supplied navigation input at a user input device;

computer code for causing the movable window to move in a direction along a first closed path corresponding to the first zoom level and in response to the user supplied navigation input, wherein the direction of movement along the first closed path corresponds to a direction associated with the user supplied navigation input; and computer code for successively presenting a first pre-determined number of overlaid portions of the image at specific positions on the first closed path that cumulatively present substantially the entire image, wherein the first pre-determined number successive overlaid portions are related to the first zoom level and the specific locations on the first closed path are based upon the first zoom level, wherein when the user supplied navigation input is circular in nature, then a first direction corresponds to a counterclockwise type user supplied navigation input and a second direction corresponds to a clockwise type user supplied navigation input.

13. A computer readable medium as recited in claim 12 further comprising:

computer code for changing the first zoom level to a second zoom level different from the first zoom level;

computer code for changing the first closed path to a second closed path different from the first closed path in accordance with the second zoom level;

computer code for receiving the user supplied navigation input;

computer code for causing the movable window to move in the direction along the second closed path corresponding to the second zoom level and in accordance with the user supplied navigation input; and computer code for successively presenting a second pre-determined number of overlaid portions of the image at specific positions on the second closed path that cumulatively present substantially the entire image, the specific locations on the second closed path based upon the second zoom level, wherein the second pre-determined number of successive overlaid portions is related to the second zoom level.

14. A computer readable medium as recited in claim 13, wherein the computer codes is arranged such that the second closed path follows a path that covers the center of the entire image such that at least one portion of the entire image that is displayed based on a position in the second closed path does not contain a portion that is on the perimeter of the entire image.

15. A computer readable medium as recited in claim 12, wherein the computer code is arranged such that when the user supplied navigational input is a counter-clockwise motion by a user's finger in contact with a rotational input device, the movable window moves in a counter-clockwise manner along the first or second closed paths; and wherein clockwise motions by the user's finger on the rotational input device correspond to clockwise movement of the movable window along the first or second closed paths.

16. A computer readable medium as recited in claim 12, wherein the computer code is arranged such that the first closed path follows a perimeter of the entire image such that any portion of the image that is displayed based on a position in the first closed path contains a portion that is on the perimeter of the image.

* * * * *